United States Patent
Sugamata et al.

(10) Patent No.: US 8,031,983 B2
(45) Date of Patent: Oct. 4, 2011

(54) LIGHT MODULATION DEVICE

(75) Inventors: Toru Sugamata, Chiyoda-ku (JP); Satoshi Oikawa, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 205 days.

(21) Appl. No.: 12/225,778

(22) PCT Filed: Mar. 6, 2007

(86) PCT No.: PCT/JP2007/054261
§ 371 (c)(1), (2), (4) Date: Jul. 14, 2009

(87) PCT Pub. No.: WO2007/122877
PCT Pub. Date: Nov. 1, 2007

(65) Prior Publication Data
US 2009/0297086 A1 Dec. 3, 2009

(30) Foreign Application Priority Data
Mar. 30, 2006 (JP) ................................. 2006-093098

(51) Int. Cl.
*G02F 1/035* (2006.01)

(52) U.S. Cl. .................... 385/2; 385/14; 385/1; 385/132

(58) Field of Classification Search .................... 385/1, 2, 385/3, 4, 5, 8, 9, 14, 40, 132; 156/153, 154, 156/209, 219, 220, 221, 222
See application file for complete search history.

(56) References Cited

U.S. PATENT DOCUMENTS

| 6,270,604 | B1 * | 8/2001 | McCallion et al. | 156/99 |
| 6,480,639 | B2 | 11/2002 | Hashimoto et al. | 385/14 |
| 6,511,571 | B2 * | 1/2003 | McCallion et al. | 156/250 |
| 6,904,186 | B2 | 6/2005 | Kondo et al. | 385/2 |
| 7,035,485 | B2 | 4/2006 | Kondo et al. | 385/2 |
| 7,295,742 | B2 * | 11/2007 | Sugita et al. | 385/129 |
| 7,310,453 | B2 | 12/2007 | Ichikawa et al. | 385/3 |
| 7,362,924 | B2 | 4/2008 | Ichioka et al. | 385/2 |
| 7,729,580 | B2 * | 6/2010 | Tanaka et al. | 385/49 |
| 2004/0264832 | A1 * | 12/2004 | Kondo et al. | 385/14 |

(Continued)

FOREIGN PATENT DOCUMENTS
EP       1 870 765 A1    12/2007
(Continued)

*Primary Examiner* — Brian Healy
(74) *Attorney, Agent, or Firm* — Chapman and Cutler LLP

(57) ABSTRACT

The present invention is directed to provide a light modulation device capable of not only restricting the faint light propagating in the adhesive layer from being re-incident on the thin substrate but also increasing an adhesive strength of the thin substrate and the supplementing plate. The invention is characterized in a light modulation device having a thin substrate 1 made of material with an electro-optical effect and with a thickness of below 20 μm; an optical waveguide 2 formed on a surface of the thin substrate or the other surface thereof; and a modulation electrode 3 formed on the surface of the thin substrate and for modulating light passing through the optical waveguide, comprising: a supplementing plate 5 adapted to be bonded to the thin substrate via an adhesive layer 4, wherein a bonding surface of the supplementing plate is formed as a rough surface 10 relative to a bonding surface of the thin substrate. A roughness of the rough surface is preferred to be over $1/10$ of a wavelength of faint light propagating in the adhesive layer.

9 Claims, 1 Drawing Sheet

U.S. PATENT DOCUMENTS

2009/0297086 A1* 12/2009 Sugamata et al. ............... 385/2

FOREIGN PATENT DOCUMENTS

| | | |
|---|---|---|
| JP | 64-018121 A | 1/1989 |
| JP | 4-152306 A | 5/1992 |
| JP | 4-190321 A | 7/1992 |
| JP | 4-204524 A | 7/1992 |
| JP | 6-289341 A | 10/1994 |
| JP | 11-248954 A | 9/1999 |
| JP | 2003-215519 A | 7/2003 |
| JP | 2004-093905 A | 3/2004 |
| JP | 2006-276518 A | 10/2006 |
| JP | 2006-309124 A | 11/2006 |
| JP | 2007-114222 A | 5/2007 |

* cited by examiner

LIGHT MODULATION DEVICE

BACKGROUND OF THE INVENTION

1. Field of the Invention

The present invention relates to a light modulation device, and more particularly, to a light modulation device using a thin film made of material with an electro-optical effect.

2. Description of the Background Art

Conventionally, a waveguide type light modulation device where optical waveguides or modulation electrodes are formed on a substrate having an electro-optical effect, has been much used in an optical communication field or an optical measurement field.

Specially, an information transfer amount has a tendency to be increased accompanied by progress of multimedia and thus a widening of a light modulation frequency is demanded. As means for realizing the widening, an external modulation method by an LN modulator or the like employing $LiNbO_3$ (hereinafter, referred to as "LN") has been proposed. However, in order to realize the widening of the LN modulator, a velocity matching between a microwave which is a modulation signal and a light wave and reduction of driving voltages are required.

As means for solving such problems, it has been known conventionally that making a thickness of a substrate thin is intended to satisfy a velocity matching condition of a microwave and a light wave as well as to reduce driving voltages.

In the following Patent Document 1 or 2, an optical waveguide and modulation electrodes are formed on a substrate (hereinafter, referred to as "first substrate") with a thickness of below 30 μm and another substrate (hereinafter, referred to as "second substrate") with a lower permittivity than the first substrate is bonded thereto, to reduce an effective refractive for the microwave for intending to match a velocity between the microwave and the light wave and further to maintain strength of the substrates.

Patent Document 1: Japanese Patent Application Laid-Open No. S64-18121

Patent Document 2: Japanese Patent Application Laid-Open No. 2003-215519

In the Patent Document 1 or 2, $LiNbO_3$ is mainly used for the first substrate, and material with a lower permittivity than LN, such as quartz, glass, alumina or the like is used for the second substrate. A temperature drift or a DC drift accompanied by a temperature variation occurs in a combination of such material by a difference of a coefficient of linear expansion therebetween. Patent Document 2 discloses that, in order to remove such inconvenience, the bonding of the first substrate and the second substrate is performed by use of an adhesive with a coefficient of linear expansion close to the first substrate.

However, comparing a modulator using the LN substrate which has been manufactured conventionally with a modulator to make the LN substrate thin, as the substrate becomes thinner, light emitted or leaked from the optical waveguide, or light and the like incident on other than the optical waveguide from an optical fiber for incidence (hereinafter, such light is referred to as "faint light.") has a strong tendency to be confined within the substrates. In the conventional LN substrate, since the substrate is thick (e.g., 500 μm to 1000 μm), there are sufficient areas which do not influence the waveguide (e.g., several μm in depth) and a spatial distribution density of light filled with the faint light (hereinafter, referred to as "faint light density") becomes lower. As a result, the faint light has little impact. However, when a thickness of the substrate is the same as a distance in a depth direction of the waveguide, since a faint light density propagating in a direction parallel to a surface of the substrate within the substrate becomes higher, the faint light propagates within the substrate to be re-incident on the optical waveguide or to be incident on an optical fiber for output connected to a light modulation device, resulting in deteriorating a S/N ratio of output light.

In addition, when a thin substrate is used for a light modulation device, since the thin substrate cannot give a sufficient strength, the thin substrate which is the first substrate and the second substrate are required to be bonded by a supplementing plate by use of an adhesive. In this case, when a refractive of the adhesive is lower than that of the thin substrate, the confinement of the faint light is more outstanding. For this reason, this applicant has proposed in Patent Document 3 that a light absorbing portion, a high refractive portion, a light guide portion or a concave portion is formed in an area excluding the optical waveguide and a periphery thereof in the thin substrate, to remove the faint light within the thin substrate.

Patent Document 3: Japanese Patent Application No. 2005-96447 (Application Date: Mar. 29, 2005)

However, like Patent Document 2, there is a problem in that, when a surface, which is opposite to the thin substrate, of a adhesive layer of the supplanting plate is smoothed, the faint light emitted to other than the optical waveguide is reflected on the surface of the supplementing plate to be re-incident on the thin substrate, thereby recombining with the optical waveguide.

SUMMARY OF THE INVENTION

Problems to be Solved by the Invention

The present invention is directed to solve such problems and to provide a light modulation device capable of not only restricting the faint light propagating in the adhesive layer from being re-incident on the thin substrate but also increasing an adhesive strength of the thin substrate and the supplementing plate.

Means for Solving the Problem

For solving such problems, the invention related to claim 1 is characterized in a light modulation device having a thin substrate made of material with an electro-optical effect and with a thickness of below 20 μm; an optical waveguide formed on a surface of the thin substrate or the other surface thereof; and a modulation electrode formed on the surface of the thin substrate and for modulating light passing through the optical waveguide, comprising: a supplementing plate adapted to be bonded to the thin substrate via an adhesive layer, wherein a bonding surface of the supplementing plate is formed as a rough surface relative to a bonding surface of the thin substrate.

The invention related to claim 2 is characterized in that, in the light modulation device according to claim 1, a roughness of the rough surface is over 1/10 of a wavelength of faint light propagating in the adhesive layer.

The invention related to claim 3 is characterized in a light modulation device having a thin substrate made of material with an electro-optical effect and with a thickness of below 20 mm; an optical waveguide formed on a surface of the thin substrate or the other surface thereof; and a modulation electrode formed on the surface of the thin substrate and for modulating light passing through the optical waveguide, comprising: a supplementing plate adapted to be bonded to the thin substrate via an adhesive layer, wherein a bonding surface of the supplementing plate is formed as a concavo-convex structure.

The invention related to claim 4 is characterized in that, in the light modulation device according to claim 3, a height of a convex of the concavo-convex structure is over 1/10 of a wavelength of faint light propagating in the adhesive layer.

The invention related to claim 5 is characterized in a light modulation device having a thin substrate made of material with an electro-optical effect and with a thickness of below 20 mm; an optical waveguide formed on a surface of the thin substrate or the other surface thereof; and a modulation electrode formed on the surface of the thin substrate and for modulating light passing through the optical waveguide, comprising: a supplementing plate adapted to be bonded to the thin substrate via an adhesive layer, wherein a bonding surface of the supplementing plate is formed as a inclined surface which is inclined with respect to a bonding surface of the thin substrate.

The invention related to claim 6 is characterized in that, in the light modulation device according to any one of claims 1 to 5, the optical waveguide is set such that a propagation constant of a light wave propagating in the optical waveguide differs partially.

Effects of the Invention

According to the invention related to claim 1, since, in a light modulation device having a thin substrate made of material with an electro-optical effect and with a thickness of below 20 μm; an optical waveguide formed on a surface of the thin substrate or the other surface thereof; and a modulation electrode formed on the surface of the thin substrate and for modulating light passing through the optical waveguide, which comprises a supplementing plate adapted to be bonded to the thin substrate via an adhesive layer, wherein a bonding surface of the supplementing plate is formed as a rough surface relative to a bonding surface of the thin substrate, it is possible to scatter faint light incident on the adhesive layer from the thin substrate on the rough surface of the bonding surface of the supplementing plate, to restrict the faint light from being re-incident on the thin substrate from the adhesive layer. Furthermore, since the bonding surface of the supplementing plate is formed as the rough surface, a contact area with the adhesive layer can be increased, to increase an adhesive strength of the thin substrate and the supplementing plate.

According to the invention related to claim 2, since a roughness of the rough surface is over 1/10 of a wavelength of faint light propagating in the adhesive layer, the faint light can be scattered on the bonding surface of the supplementing plate effectively.

According to the invention related to claim 3, since, in a light modulation device having a thin substrate made of material with an electro-optical effect and with a thickness of below 20 μm; an optical waveguide formed on a surface of the thin substrate or the other surface thereof; and a modulation electrode formed on the surface of the thin substrate and for modulating light passing through the optical waveguide, which comprises supplementing plate adapted to be bonded to the thin substrate via an adhesive layer, wherein a bonding surface of the supplementing plate is formed as a concavo-convex structure, it is possible to scatter faint light incident on the adhesive layer from the thin substrate on the concavo-convex structure to restrict the faint light from being re-incident on the thin substrate from the adhesive layer. In addition, since the bonding surface of the supplementing plate is formed as the concavo-convex structure, a contact area with the adhesive layer can be increased, to increase an adhesive strength of the thin substrate and the supplementing plate.

According to the invention related to claim 4, since a height of a convex of the concavo-convex structure is over 1/10 of a wavelength of faint light propagating in the adhesive layer, the faint light can be scattered on the bonding surface of the supplementing plate effectively.

According to the invention related to claim 5, since, in a light modulation device having a thin substrate made of material with an electro-optical effect and with a thickness of below 20 μm; an optical waveguide formed on a surface of the thin substrate or the other surface thereof; and a modulation electrode formed on the surface of the thin substrate and for modulating light passing through the optical waveguide, which comprises a supplementing plate adapted to be bonded to the thin substrate via an adhesive layer, wherein a bonding surface of the supplementing plate is formed as a inclined surface which is inclined with respect to a bonding surface of the thin substrate, faint light incident on the adhesive layer from the thin substrate is reflected on the inclined surface to be changed towards other than thin substrate in a direction thereof, thereby restricting the faint light from being re-incident on the thin substrate or the optical waveguide from the adhesive layer.

In addition, since the bonding surface of the supplementing plate is formed as the inclined surface, a contact area with the adhesive layer can be increased, to increase an adhesive strength of the thin substrate and the supplementing plate.

According to the invention related to claim 6, since the optical waveguide is set such that a propagation constant of a light wave propagating in the optical waveguide differs partially, the effect of removing the faint light from the supplementing plate together with the effect of preventing the recombination of the faint light by adjustment of the propagation constant can prevent the faint light from recombining with the optical waveguide more effectively.

DESCRIPTION OF REFERENCE NUMERALS

1: THIN SUBSTRATE
2: OPTICAL WAVEGUIDE
3: MODULATION ELECTRODE
4: ADHESIVE LAYER
5: SUPPLEMENTING PLATE
10: ROUGH SURFACE
11: CONCAVO-CONVEX STRUCTURE
12: INCLINED SURFACE

DETAILED DESCRIPTION OF THE PREFERRED EMBODIMENTS OF THE INVENTION

Hereinafter, embodiments of the present invention will be described using suitable examples.

Figure 1:
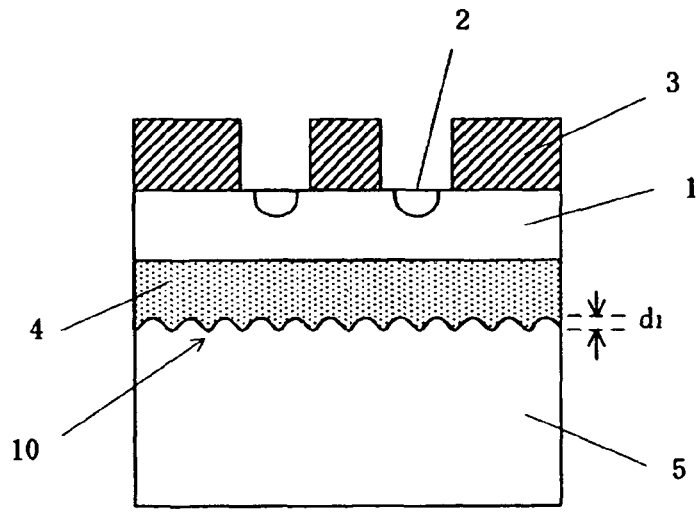
FIG. 1 is a sectional view to illustrate an embodiment 1 related to a light modulation device of the present invention.

FIG. 1 illustrates an embodiment 1 related to a light modulation device of the present invention. FIG. 1 is a sectional view of the light modulation device, which includes a thin substrate 1 with a thickness of below 20 μm and made of material with an electro-optical effect, an optical waveguide 2 formed on a surface of the thin substrate, and a modulation electrode 3 for modulating light passing through the optical waveguide. In addition, the optical waveguide 2 may be formed on the other surface of the thin substrate 1.

Furthermore, the thin substrate 1 is bonded to a supplementing plate 5 via an adhesive 4.

The optical waveguide 2 may be formed by diffusing Ti or the like on a surface of the substrate, using a thermal diffusion method or a proton exchanging method. In addition, like that disclosed in Patent Document 4, the optical waveguide may be configured by forming a ridge on the surface of the thin substrate 1 fitting to a shape of the optical waveguide.

The modulation electrode 3 such as a signal electrode or a ground electrode may be formed by formation of electrode pattern of Ti/Au, a gold-plate method and the like. Moreover, if necessary, a buffer layer (not shown) of a dielectric such as $SiO_2$ may be provided on the surface of the substrate after formation of the optical waveguide, to form the modulation electrode on the buffer layer.

Patent Document 4: Japanese Patent Application Laid-Open No. H6-289341

As material with an electro-optical effect, for example, lithium niobate, lithium tantalite, PLZT (lead zirconate titanate), quartz-based material, and a combination thereof are available. In particular, the lithium niobate (LN) crystal with high electro-optical effect is employed suitably.

According to a method of manufacturing the thin substrate 1 including the light modulation device, the above-described optical waveguide is formed on a substrate with a thickness of several hundreds μm, and the other surface of the substrate is grinded to create a thin substrate with a thickness of below 20 μm. Then, the modulation electrode is formed on the surface of the thin substrate. In addition, the other surface of the substrate may be grinded after formation of the optical waveguide or the modulation electrode. Further, since the thin substrate is in danger of destruction due to a thermal impact upon formation of the optical waveguide or a mechanical impact according to handling of the thin substrate upon various processes, a process where such thermal or mechanical impact is applied thereto easily is preferably performed before making the substrate thin by grinding.

As material used for the supplementing plate 5, various kinds of material are available, for example, in addition to use of material identical to the thin substrate, material with a lower permittivity than the thin substrate, such as quartz, glass, alumina and so on may be used, or material with a crystalline orientation different from the thin substrate may be used like that disclosed in Patent Document 4. However, selection of material with coefficient of linear expansion identical to the thin substrate is preferably in stabilizing a modulation characteristic of the light modulation device relative to a temperature variation. If it is difficult to select material identical thereto, an adhesive for bonding the thin substrate and the supplementing plate is selected as material with a coefficient of linear expansion identical to the thin substrate as disclosed in patent document 2.

For the bonding of the thin substrate 1 and the supplementing plate 5, various kinds of adhesive material, for example, an epoxy based adhesive, a thermosetting adhesive, an ultraviolet thermosetting adhesive, solder glass, or, a thermosetting, a photo curable or a light-increasing-viscosity resin adhesive sheet or the like may be used as the adhesive 4.

In the light modulation device as shown in FIG. 1, faint light occurs in the thin substrate other than the optical waveguide from a light splitter or a light summer of the optical waveguide formed in the thin substrate, or from a bonding portion of an optical fiber for incidence and the light modulation device. In addition, when a thickness of the thin substrate is thin, and, in particular, the thickness thereof is set to below 20 μm, a problem is easy to happen that the faint light propagates in the thin substrate to be incident on the optical waveguide or an optical fiber for output. Especially, a main object of the present invention is to prevent a light wave incident on the adhesive layer from the thin substrate 1 from being incident on the thin substrate back to recombine with the optical waveguide and so on.

In order to prevent the light wave propagating in the adhesive layer 4 from being re-incident on the thin substrate 1, in the light modulation device of the present invention, a bonding surface where the supplementing plate 5 is bonded to the thin substrate 1 is formed as a rough surface 10 compared with a bonding surface (a lower surface of the thin substrate 1 in FIG. 1) of the thin substrate 1, as shown in FIG. 1. The formation of the rough surface 10 scatters the faint light in the adhesive layer on the rough surface to restrict the faint light from being re-incident on the thin substrate 1. Furthermore, since the bonding surface of the supplementing plate is formed as the rough surface, a contact area with the adhesive layer can be increased, to increase an adhesive strength of the thin substrate and the supplementing plate.

In addition, the rough surface extends in a transverse direction as well as in a direction vertical to a sectional surface in FIG. 1.

Since the rough surface 10 is required to serve as a scattering surface for the faint light, a roughness d1 of the corresponding rough surface preferably has a value of over $1/10$ ($\lambda/10$) relative to a wavelength $\lambda$ of the faint light propagating in the adhesive layer.

If the roughness of the rough surface is lower than $\lambda/10$, the faint light cannot be scattered effectively.

Subsequently, an embodiment 2 related to the light modulation device of the present invention will be described.

Figure 2:
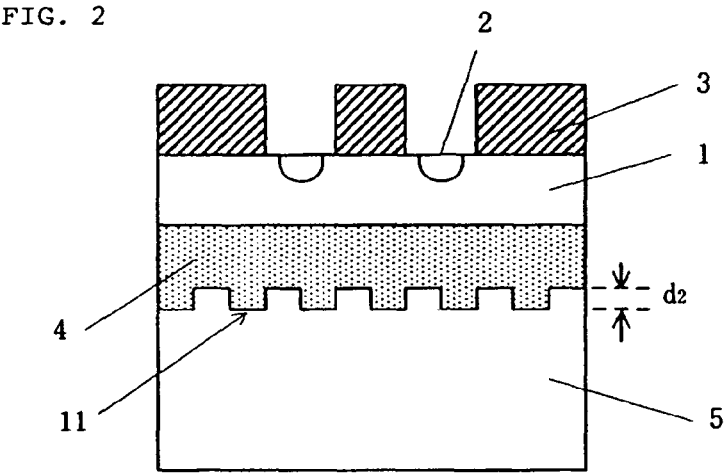
FIG. 2 is a sectional view to illustrate an embodiment 2 related to a light modulation device of the present invention.

FIG. 2 is a diagram to illustrate the embodiment 2 of the light modulation device, in which like reference numerals are used for like elements in FIG. 1.

A characteristic of the embodiment 2 is that a bonding surface where the supplementing plate 5 is bonded to the thin substrate 1 is formed as a concavo-convex structure 11.

The formation of the concavo-convex structure 11 scatters the faint light in the adhesive layer on the concavo-convex structure to restrict the faint light from being re-incident on the thin substrate 1. In addition, since the bonding surface of the supplementing plate is formed as the concavo-convex structure, a contact area with the adhesive layer can be increased, to increase an adhesive strength of the thin substrate and the supplementing plate.

In addition, the concavo-convex structure extends in a transverse direction as well as in a direction vertical to a sectional surface in FIG. 2.

Since the concavo-convex structure 11 is also required to serve as a scattering surface for the faint light like the rough surface 10 in FIG. 1, a height d2 of the convex of the corresponding concavo-convex structure 11 preferably has a value of over $1/10$ ($\lambda/10$) relative to a wavelength $\lambda$ of the faint light propagating in the adhesive layer.

If the height of the convex is lower than $\lambda/10$, the faint light cannot be scattered effectively.

Successively, an embodiment 3 related to the light modulation device of the present invention will be described.

Figure 3:
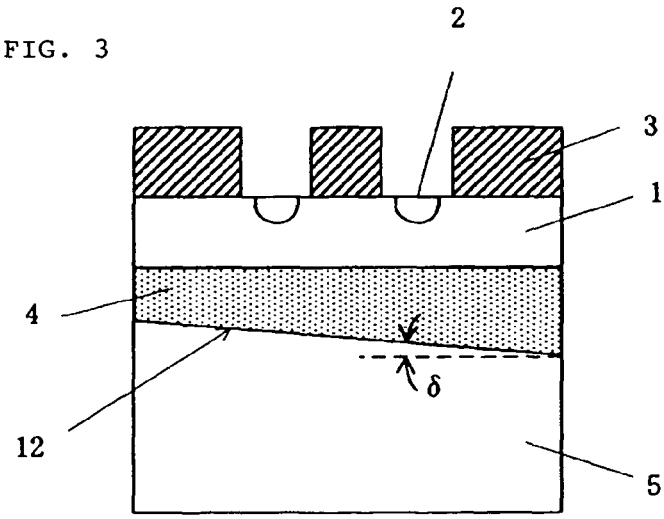
FIG. 3 is a sectional view to illustrate an embodiment 3 related to a light modulation device of the present invention.

FIG. 3 is a diagram to illustrate the embodiment 3 of the light modulation device, in which like reference numerals are used for like elements in FIGS. 1 and 2.

A characteristic of the embodiment 3 is that a bonding surface where the supplementing plate 5 is bonded to the thin substrate 1 is formed as an inclined surface 12 which is inclined with respect to the thin substrate 1, particularly, a bonding surface (a lower surface of the thin substrate 1 in FIG. 3) of the thin substrate 1.

By the formation of the inclined surface 12, the faint light in the adhesive layer is reflected on the inclined surface 12 to be changed towards other than thin substrate 1 in a direction thereof, thereby restricting the faint light from being re-incident on the thin substrate 1.

In addition, since the bonding surface of the supplementing plate is formed as the inclined surface, a contact area with the adhesive layer can be increased, to increase an adhesive strength of the thin substrate and the supplementing plate.

Although the shape of the inclined surface 12 is represented to be inclined by an inclined angle δ with respect to the thin substrate 1 within a plane vertical to a propagation direction of the light wave in the optical waveguide 2 in FIG. 3, the present invention is not limited thereto, but it may be configured so that the inclined surface is inclined with respect to the thin substrate 1 within a plane parallel to a propagation direction of the light wave in the optical waveguide.

In addition, the inclined surface 12 which is inclined in a predetermined direction only with respect to the bonding surface of the thin substrate 1 is possible as shown in FIG. 3 as well as a mountain-shape inclined surface which is lowered in a height thereof as goes to left and right from the center of FIG. 3 is possible.

A value of the inclined angle δ of the inclined surface 12 may be set to any value, if the value is in a range where most of the faint light reflected on the bonding surface of the supplementing plate is not incident on the thin substrate 1 or the optical waveguide 2.

As illustrated in the embodiments 1 to 3 related to the light modulation device of the present invention, the shape of the bonding surface of the supplementing plate 5 is largely different from the shape of the bonding surface of the thin substrate 1 which is bonded thereto via the same adhesive layer. For this reason, when the supplementing plate 5 is transformed by a thermal expansion, a thermal stress from the supplementing plate 5 may be in danger of local concentration without uniform application to the thin substrate 1. Such concentration of the thermal stress is a cause to deteriorate optical characteristics of the light modulation device.

Therefore, a thickness of the adhesive layer is preferably over 10 μm in order to mitigate the thermal stress from the supplementing plate 5.

In addition, in the light modulation device of the present invention, even if the faint light is re-incident on the thin substrate from the adhesive layer, the optical waveguide is designed and adjusted so that a propagation constant of the light wave propagating in the optical waveguide differs partially, to restrict recombination of the faint light and the optical waveguide as disclosed in Patent Document 5. In this way, the effect of removing the faint light from the supplementing plate according to the embodiments 1 to 3 together with the effect of preventing the recombination of the faint light by adjustment of the propagation constant can prevent the faint light from recombining with the optical waveguide more effectively.

As a method of adjusting the propagation constant, there is a method of adjusting a width of the optical waveguide or a method of diffusing or loading material for changing a propagation constant, for example, $MgO$, $SiO_2$, $TiO_2$ or $ZnO$ on the optical waveguide or a periphery thereof, and this changes a refractive of the optical waveguide.

Patent Document 5: Japanese Patent Application No. 2005-104307 (Application date: Mar. 31, 2005)

INDUSTRIAL APPLICABILITY

As described above, according to the present invention, it is possible to provide a light modulation device capable of not only preventing faint light propagating in an adhesive layer from being re-incident on a thin substrate but also increasing an adhesive strength between the thin substrate and a supplementing plate.

The invention claimed is:

1. A light modulation device having a thin substrate made of material with an electro-optical effect and with a thickness of below 20 μm; an optical waveguide formed on a first surface of the thin substrate or a second surface thereof; and a modulation electrode formed on the surface of the thin substrate and for modulating light passing through the optical waveguide, comprising:
   a supplementing plate adapted to be bonded to the thin substrate via an adhesive layer,
   wherein a bonding surface of the supplementing plate is formed as a rough surface relative to a bonding surface of the thin substrate, and
   the optical waveguide is set such that a propagation constant of a light wave propagating in the optical waveguide differs partially.

2. A light modulation device having a thin substrate made of material with an electro-optical effect and with a thickness of below 20 μm; an optical waveguide formed on a first surface of the thin substrate or a second surface thereof; and a modulation electrode formed on the surface of the thin substrate and for modulating light passing through the optical waveguide, comprising:
   a supplementing plate adapted to be bonded to the thin substrate via an adhesive layer,
   wherein a bonding surface of the supplementing plate is formed as a rough surface relative to a bonding surface of the thin substrate, and
   a roughness of the rough surface is over 1/10 of a wavelength of faint light propagating in the adhesive layer.

3. A light modulation device having a thin substrate made of material with an electro-optical effect and with a thickness of below 20 μm; an optical waveguide formed on a first surface of the thin substrate or a second surface thereof; and a modulation electrode formed on the surface of the thin substrate and for modulating light passing through the optical waveguide, comprising:
   a supplementing plate adapted to be bonded to the thin substrate via an adhesive layer,
   wherein a bonding surface of the supplementing plate is formed as a concavo-convex structure.

4. The light modulation device according to claim 3, wherein a height of a convex of the concavo-convex structure is over 1/10 of a wavelength of faint light propagating in the adhesive layer.

5. A light modulation device having a thin substrate made of material with an electro-optical effect and with a thickness of below 20 μm; an optical waveguide formed on a first surface of the thin substrate or a second surface thereof; and a modulation electrode formed on the surface of the thin substrate and for modulating light passing through the optical waveguide, comprising:

a supplementing plate adapted to be bonded to the thin substrate via an adhesive layer, wherein a bonding surface of the supplementing plate is formed as an inclined surface which is inclined with respect to a bonding surface of the thin substrate.

6. The light modulation device according to claim 2, wherein the optical waveguide is set such that a propagation constant of a light wave propagating in the optical waveguide differs partially.

7. The light modulation device according to claim 3, wherein the optical waveguide is set such that a propagation constant of a light wave propagating in the optical waveguide differs partially.

8. The light modulation device according to claim 4, wherein the optical waveguide is set such that a propagation constant of a light wave propagating in the optical waveguide differs partially.

9. The light modulation device according to claim 5, wherein the optical waveguide is set such that a propagation constant of a light wave propagating in the optical waveguide differs partially.

* * * * *